United States Patent
Akasaka et al.

(10) Patent No.: US 7,153,604 B2
(45) Date of Patent: Dec. 26, 2006

(54) LIQUID FUEL CELL DEVICE

(75) Inventors: Yoshihiro Akasaka, Kawasaki (JP); Hideyuki Ohzu, Yokohama (JP); Wu Mei, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 524 days.

(21) Appl. No.: 10/667,784

(22) Filed: Sep. 23, 2003

(65) Prior Publication Data

US 2004/0121214 A1 Jun. 24, 2004

(30) Foreign Application Priority Data

Sep. 30, 2002 (JP) ............... 2002-285569

(51) Int. Cl.
*H01M 8/04* (2006.01)
(52) U.S. Cl. .................. 429/34; 429/17
(58) Field of Classification Search .......... 429/17, 429/34
See application file for complete search history.

(56) References Cited

U.S. PATENT DOCUMENTS 5,249,957 A * 10/1993 Hirata ................. 431/354
5,599,638 A   2/1997 Surampudi et al.
6,303,244 B1  10/2001 Surampudi et al.
6,686,081 B1 * 2/2004 Gottesfeld ................. 429/30

FOREIGN PATENT DOCUMENTS

JP  8-144958    6/1996
JP  2002-110199 4/2002

* cited by examiner

*Primary Examiner*—Gregg Cantelmo
(74) *Attorney, Agent, or Firm*—Oblon, Spivak, McClelland, Maier & Neustadt, P.C.

(57) ABSTRACT

A liquid fuel cell device includes a liquid fuel cell body with a fuel electrode, an oxidizer electrode and an electrolyte layer between the electrodes, and a liquid fuel supply system supplying a liquid fuel to the fuel electrode. The fuel supply system includes a first tank configured to contain a concentration-adjusted liquid fuel and supply the concentration-adjusted liquid fuel to the fuel electrode, and a second tank configured to contain a high-concentration liquid fuel and supply the high-concentration liquid fuel to the first tank. The first tank includes an internal liquid transfer device configured to transfer the concentration-adjusted liquid fuel to the fuel electrode. The cell device further includes an external driving device provided outside the first tank and configured to drive the internal liquid transfer device. The external driving device is physically separated from the internal liquid transfer device.

24 Claims, 5 Drawing Sheets

LIQUID FUEL CELL DEVICE

CROSS-REFERENCE TO RELATED APPLICATIONS

This application is based upon and claims the benefit of priority from the prior Japanese Patent Application No. 2002-285569, filed Sep. 30, 2002, the entire contents of which are incorporated herein by reference.

BACKGROUND OF THE INVENTION

1. Field of the Invention

The present invention relates to a liquid fuel cell device and liquid fuel tanks employed therein, and more specifically to a liquid fuel cell device capable of generating electrical power for a longer period of time even when it is made compact.

2. Description of the Related Art

Recently, fuel cells are becoming a focus of attention, since they have high efficiencies as single power generator devices. The fuel cells are mainly categorized into two types: a gas fuel cell in which a gas is used as the fuel, such as a phosphoric acid fuel cell, a molten carbonate fuel cell, a polymer electrolyte fuel cell and an alkaline electrolyte fuel cell; and a liquid fuel cell in which a liquid is used as the fuel, such as a methanol liquid fuel cell and a hydrazine liquid fuel cell. These fuel cells are designed mainly as a power source for driving an electrical power generator, and a large-scale device. Thus, it is necessary to employ a compressor, a pump or the like, for introducing the gas or liquid fuel and the oxidizer gas into the cell. However, in the case of fuel cells that use liquid fuels as their fuels, a useful type of such devices is that a liquid fuel is introduced into the cell by the capillary force and a fuel vaporizing section that vaporizes the liquid fuel in the cell is provided as a separate unit in order to improve the reaction rate (see Jpn. Pat. Appln. KOKAI Publication No. 10-278759, for example.)

Meanwhile, the recent trend of our society indicates that various devices such as audio devices and radio devices are downsized as the technology in the filed of semiconductor develops, and there is an increasing demand of devices of a higher portability. As the power source that can meet these demands, a simple primary battery or secondary battery is known, for example. However, in terms of functionality, primary or secondary batteries have limited time of use, and naturally, the time of use of an OA device that operates on such a battery is limited. In the case where one of these batteries is used, if the battery has completely discharged, the OA device can still be operated by replacing it. However, with a primary battery, the time of use is short for its weight, and therefore it is not suitable for a portable device. On the other hand, in the case of a secondary battery, it has an advantage of being rechargeable once it completely discharged, but at the same time, it requires a power source for charging, and therefore the location of its use is limited. In addition, the second battery entails another disadvantage of requiring a long time to recharge it. In particular, in an OA device or the like in which a secondary battery is installed, it is not easy to replace the battery when the battery has completely discharged, and therefore the usable time of the device is very much limited. As described, it is difficult, with the techniques of the conventional primary or secondary batteries, to operate various types of small-sized devices for a long period of time. Therefore, there is a strong demand for a battery or cell that is suitable for a long time operation.

As a solution for such a problem, there has been proposed liquid fuel cells described above. The liquid fuel cells have not only an advantage that they can generate electricity only by supplying a liquid fuel and an oxidizer, but also an advantage that they can generate electricity continuously if the liquid fuel is replaced. Thus, if they can be reduced in size, the liquid fuel cells can become an extremely advantageous system for small-sized devices including OA devices, which have a low consumption power.

However, when the liquid fuel cells are to be downsized, providing portability, various types of accessory device, especially, the liquid fuel supply system including a liquid fuel tank for supplying a liquid fuel to the liquid fuel cell must be reduced also in size. If the liquid fuel supply system, especially, its liquid fuel tank, is made small, the time for the cell to be able to continuously generate electricity is naturally shortened since the supply of the liquid fuel from one liquid fuel tank is shortened. Therefore, it is necessary to replace the liquid fuel tank frequently.

Further, some of the fuel cells of the type that supplies the liquid fuel use driving devices including a gear, which is used to supply a liquid fuel into the liquid fuel tank from outside. In these fuel cells, it is necessary to provide a liquid sealing at the connection portion of the tank with the outside device. In addition, due to deterioration over time, the leakage of the liquid occurs at the connection in some cases, making it impossible to obtain a stable output.

BRIEF SUMMARY OF THE INVENTION

According to an aspect of the present invention, there is provided a liquid fuel cell device comprising:

a liquid fuel cell body including a fuel electrode, an oxidizer electrode placed opposite to the fuel electrode and an electrolyte layer provided between the fuel electrode and oxidizer electrode; and a liquid fuel supply system configured to supply a liquid fuel to the fuel electrode, the liquid fuel supply system comprising a first tank configured to contain a concentration-adjusted liquid fuel and supply the concentration-adjusted liquid fuel to the fuel electrode; and a second tank configured to contain a high-concentration liquid fuel and supply the high-concentration liquid fuel to the first tank, the first tank comprising a first internal liquid transfer device configured to transfer the concentration-adjusted liquid fuel to the fuel electrode, the fuel cell device further comprising a first external driving device provided outside the first tank and configured to drive the first internal liquid transfer device, the first external driving device being physically separated from the first internal liquid transfer device.

DETAILED DESCRIPTION OF THE INVENTION

Embodiments of the present invention will now be described in more detail.

A liquid fuel cell device according to an embodiment of the present invention includes a liquid fuel cell body and a liquid fuel supply system that supplies a liquid fuel to a fuel electrode of the cell body. The liquid fuel cell body comprises the fuel electrode, an oxidizer electrode opposed to the fuel electrode, and an electrolyte layer interposed between the fuel electrode and oxidizer electrode.

Figure 1:
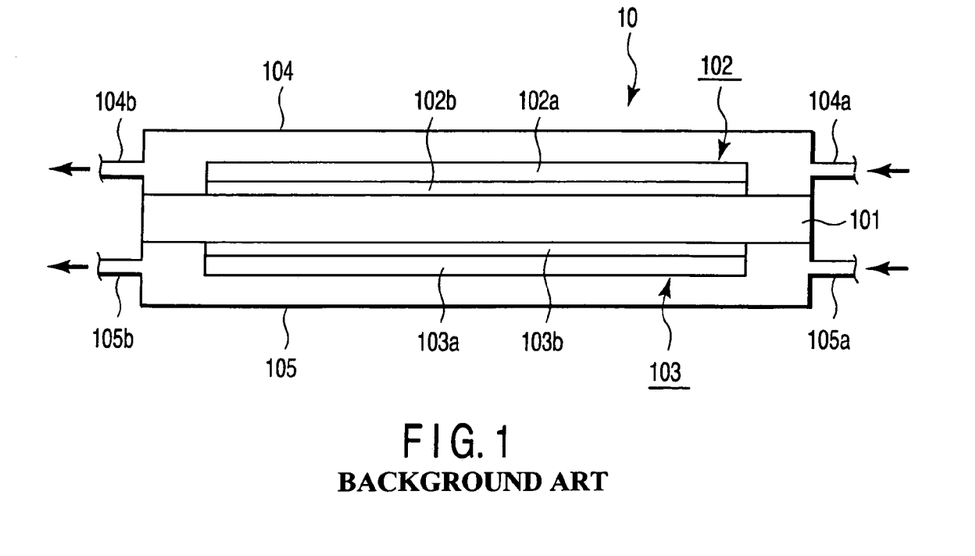
FIG. 1 is a cross-sectional view schematically showing an example of a basic structure of a liquid fuel cell that can be used in various embodiments of the present invention.

FIG. 1 is a cross-sectional view schematically showing an example of a basic structure of a liquid fuel cell body 10, which can be employed in various embodiments of the present invention. The liquid fuel cell body 10 includes an electrolyte layer 101, on one surface of which a fuel electrode (anode) 102 is provided, and on another (opposed) surface of which an oxidizer electrode (cathode) 103 is provided. The fuel electrode 102 includes an electrically conductive substrate 102a and a catalyst layer 102b provided on the substrate 102a. On the other hand, the oxidizer electrode 103 includes an electrically conductive substrate 103a and a catalyst layer 103b provided on the substrate 103a. The fuel electrode 102 and the oxidizer electrode 103 are both arranged such that the catalyst layers 102b and 103b are brought into contact with the electrolyte layer 101, respectively.

The electrolyte layer 101 can be made of a proton-conducting polymer electrolyte. As such a proton-conducting polymer electrolyte, a fluororesin-based ion-exchange resin containing sulfonic acid groups (for example, Nafion (registered tradename) of Du Pont) can be used.

The conductive substrate 102a of the fuel electrode 102 is permeable to the liquid fuel, and may be made of, for example, a porous conductive material.

On the other hand, the conductive substrate 103a of the oxidizer electrode 103 is permeable to the oxidizer gas, and may be made of a porous conductive material. Both of the catalyst layer 102b of the fuel electrode 102 and the catalyst layer 103b of the oxidizer electrode 103 can be composed of a platinum-based catalyst. In particular, the fuel electrode can be composed of Pt—Ru-based catalysts.

The fuel electrode 102 and the oxidizer electrode 103 can be prepared, for example, by supporting platinum-based catalysts on carbon particles. These platinum-based catalysts on carbon particles are applied onto a conductive substrate (for example, carbon paper or carbon cloth) using a binder, followed by drying.

A liquid fuel supply separator 104 that supplies the liquid fuel sent from the liquid fuel supply system according to an embodiment of the present invention directly to the fuel electrode 102 is provided, covering the fuel electrode 102. On the other hand, an oxidizer gas supply separator 105 that supplies the oxidizer gas is provided, covering the oxidizer electrode 103. As is known in the art, the liquid fuel supply separator 104 is provided with a liquid fuel flow channel (not shown), and the oxidizer gas supply separator 105 is provided with an oxidizer gas flow channel (not shown). Further, the liquid fuel supply separator 104 is provided with an inlet port 104a for the liquid fuel and an outlet port 104b on an opposite side for reaction products of the liquid fuel. The oxidizer gas supply separator 105 is provided with an inlet port 105a for the oxidizer gas and an outlet port 105b on an opposite side for reaction products of the oxidizer gas. It should be noted that the separators 104 and 105 serve also as collectors, and therefore they are made of an electrically conductive material.

Next, the electrode reactions that take place at the electrodes will now be described by taking an example where methanol (+water) is used as the liquid fuel and oxygen gas is used as the oxidizer gas.

On the fuel electrode (anode), the following reaction takes place:

$$CH_3OH + H_2O \rightarrow CO_2 + 6H^+ + 6e^-$$

On the oxidizer electrode (cathode), the following reaction takes place:

$$3/2 O_2 + 6H^+ + 6e^- \rightarrow 3H_2O$$

The overall reaction taking place can be represented as:

$$CH_3OH + 3/2 O_2 \rightarrow CO_2 + 2H_2O$$

Thus, the liquid fuel (methanol+water) supplied to the fuel electrode 102 is oxidized with the catalyst of the catalyst layer 102b, thus extracting protons as well as electrons. The extracted protons are conducted to the oxidizer electrode 103 via the electrolyte layer 101. On the other hand, at the oxidizer electrode 103, the reaction, in which the protons conducted via the electrolyte layer 101 react with the electrons flowing through an external circuit and the oxidizer gas (such as oxygen or air) to produce water, proceeds on the catalyst of the catalyst layer 103b. The electrons extracted during the process of the above-described reaction flow through the external circuit, thus generating electricity, and driving an external load. The carbon dioxide, which is a product of the reaction taking place on the fuel electrode, is discharged together with an excessive liquid fuel from the outlet port 104b to the outside of the system. On the other hand, the water, which is a liquid product of the reaction taking place on the oxidizer electrode, is discharged together with an excessive oxidizer gas from the outlet port 105b to the outside of the system.

In a liquid fuel cell device according to an embodiment of the present invention, the liquid fuel supply system used to supply the liquid fuel to the fuel electrode of the cell body includes a first tank that contains a concentration-adjusted liquid fuel and supplies the concentration-adjusted liquid fuel to the fuel electrode (via the separator 104), and a second tank that contains a high-concentration liquid fuel and supplies this fuel to the first tank.

Figure 2:
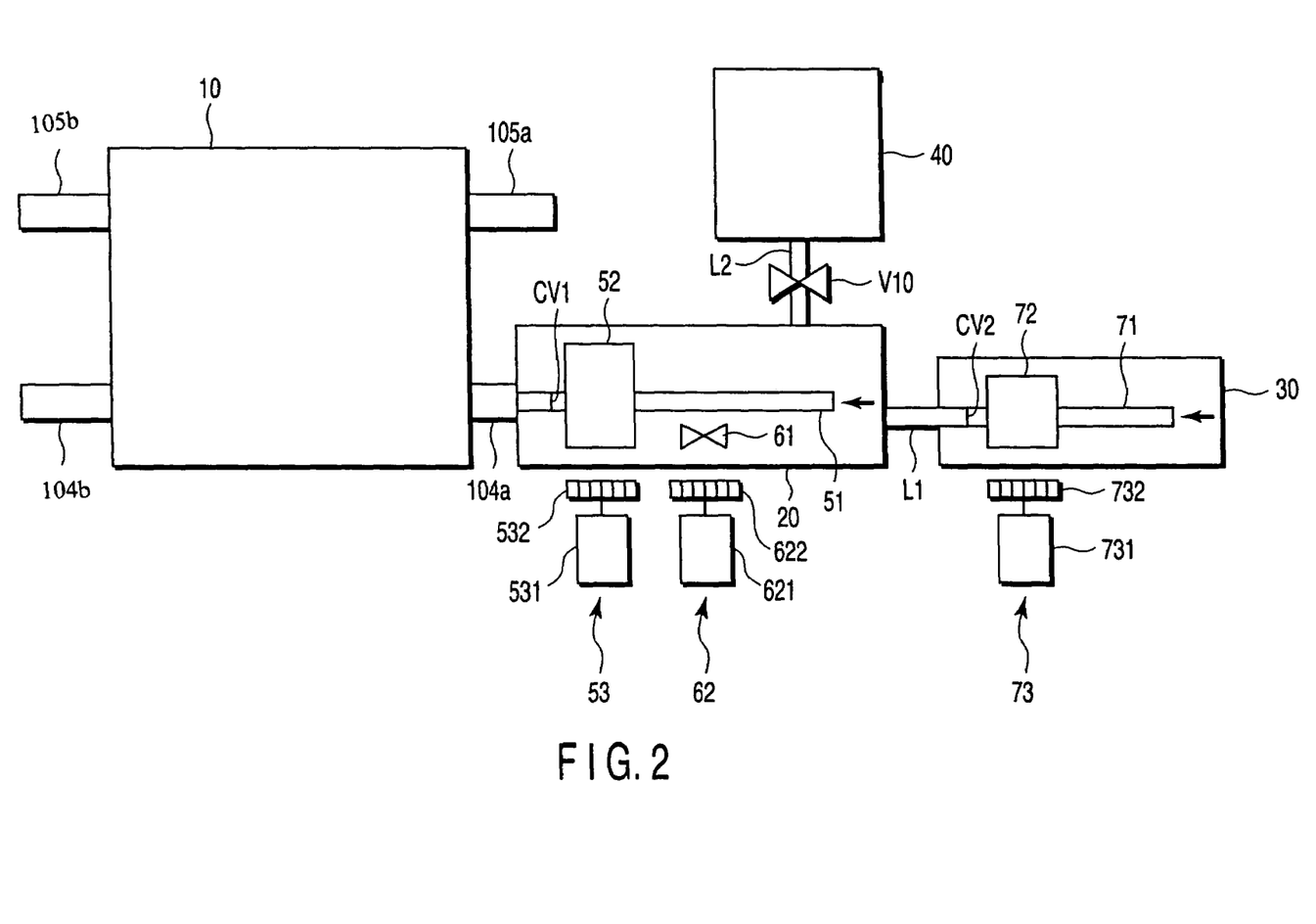
FIG. 2 is a diagram schematically showing a structure of a liquid fuel cell device according to an embodiment of the present invention.

FIG. 2 is a diagram schematically showing the structure of a liquid fuel cell device according to a first embodiment of the present invention, which includes the above-described liquid fuel supply system together with the liquid fuel cell body.

The liquid fuel cell device shown in FIG. 2 includes a liquid fuel cell body like the liquid fuel cell body 10, and a liquid fuel supply system. The liquid fuel supply system includes a first tank 20 connected to a liquid fuel inlet port 104a of cell body 10, and a second tank 30 connected to the first tank 20.

The first tank 20 contains a concentration-adjusted liquid fuel, and supplies this liquid fuel to the fuel electrode 102 of the cell body 10 via the inlet port 104a of the cell body 10 (see FIG. 1.) The second tank 30 contains a high-concentration liquid fuel (for example, a methanol liquid having a concentration of 99% or more, but less than 100%), and supplies this fuel to the first tank 20. The first tank 20 and the second tank 30 are communicated to each other via a conduit L1. The second tank 30 may be detachably connected to the first tank 20 so that it can be replaced with another.

The first tank 20 is designed to contain a liquid fuel whose concentration is adjusted to be suitable for the electrode reaction at the fuel electrode (for example, an aqueous methanol solution having a concentration of 2 M). The first tank 20 can be equipped with a concentration adjusting device for adjusting the concentration of the liquid fuel by diluting the high-concentration liquid fuel supplied from the second tank 30. In the embodiment shown in FIG. 2, the concentration adjusting device includes a diluent tank 40 that contains a diluent (for example, water) and a flow regulating valve V10, as well as a conduit L2 communicating with the first tank 20. With this device, the high-concentration liquid fuel supplied intermittently or continuously from the second tank 30 is diluted with the diluent intermittently or continuously introduced from the diluent tank 40 by open/close control of the flow regulating valve V 10 to adjust the concentration of the fuel to a predetermined degree.

Considering the chemical resistance (corrosion resistance), the first tank 20 and second tank 30 should desirably be made of a material having an excellent chemical resistant (corrosion resistant) property, including a metal such as titanium, a thermoplastic resin such as fluororesin (e.g., PTFE), hard polyvinyl chloride resin, polyethylene, polypropylene, methylpentene resin or polyurethane, a thermosetting resin such as melamine resin, or a rubber such as butadiene rubber, styrene rubber, butyl rubber, ethylene-propylene rubber, natural rubber or fluororubber (e.g., FKM or FPM). Of these materials, stainless steel, fluororesin, butadiene rubber, styrene rubber, butyl rubber, ethylene propylene rubber and natural rubber are preferred.

The first tank 20 is provided with a liquid transfer device that transfers the concentration-adjusted liquid fuel contained therein to the liquid fuel cell body. Conventionally, a liquid transfer device has been composed of a liquid transfer tube provided in the first tank 20, a liquid transfer pump that transfers the liquid fuel via the liquid transfer tube and a liquid transfer pump driving device (such as a gear) provided outside the tank 20 to be physically connected to the liquid transfer pump via a liquid-tight seal. However, such a conventional liquid transfer device would require the liquid-tight seal to be provided. At the same time, the liquid-tight seal is deteriorated over time, which causes leakage of the liquid fuel, making it not possible to obtain a stable cell output.

Then, according to an embodiment of the present invention, the liquid transfer device includes a first internal liquid transfer device that transfers the liquid fuel to the fuel electrode, and a first external driving device, provided outside the first tank and physically separated from the first internal liquid transfer device, configured to drive the first internal liquid transfer device. "Physically separated" means that a plurality of devices or members are not physically joined together, excluding the direct joint between these devices or members, or the indirect joint a plurality of devices or members being not in contact with each other, including the connection by magnetic coupling.

More specifically, as shown in FIG. 2, the liquid transfer device can be composed of a liquid transfer tube 51 provided in the first tank 20 and having one end connected to and communicating with the liquid fuel inlet port of the liquid fuel cell body 10, a liquid transfer tube driving device 52, also provided in the first tank 20, for suctioning and transferring the concentration-adjusted liquid fuel from the other end of the tube 51 by expanding and compressing the liquid transfer tube 51 repeatedly as it rotates, and a rotation device 53, provided outside the first tank 20, for rotating the liquid transfer tube driving device 52 without being in contact with the driving device 52. The rotation of the liquid transfer tube driving device 52 by means of the rotation device 53 can be done with use of a magnet coupling device that is well known in the art (for example, a radial-type magnet coupling R series of TOSHIBA CORPORATION). For example, the rotation device 53 can be composed of a rotation motor 531 and a rotation member 532 pivoted on the rotation motor 531. The liquid transferring tube driving unit 52 and the rotation member 53 can be made of such a material that they can be magnetically coupled with each other. Examples of the magnetic coupling material are Fe—B—Nd-based, Sm—Co-based, Sm—Fe—N-based, Fe—Co-based, Pt—Fe-based and ferrite-based materials.

The driving force of the rotation member 532 rotated by the motor 531 is propagated without being contact therewith to the tube driving device 52 and thus the tube driving device 52 is rotated. In this manner, the liquid transfer tube 51 is repeatedly expanded and compressed, thus making it possible to supply the concentration-adjusted liquid fuel from the liquid transfer tube 51 to the fuel electrode of the cell body 10 via the inlet port 104a.

As shown in FIG. 2, another liquid fuel transfer device having a structure similar to the above-described one can be provided in the second tank 30 as well. More specifically, the liquid fuel transfer device provided in the second tank 30 can be composed of a liquid transfer tube 71 (corresponding to the liquid transfer tube 51) provided in the second tank 30 and having one end connected to and communicating with the conduit L1, a liquid transfer tube driving device 72 (corresponding to the liquid transfer tube driving device 52), also provided in the second tank 30, for suctioning and transferring the high-concentration liquid fuel from the other end of the tube 71 by expanding and compressing the liquid transfer tube 71 repeatedly as it rotates, and a rotation device 73 (corresponding to the rotation device 53), provided outside the second tank 30, for rotating the liquid transfer tube driving device 72 without being in contact with the driving portion 72. The rotation device 73 can be composed of a rotation motor 731 (corresponding to the rotation motor 531) and a rotation member 732 (corresponding to the rotation member 532) pivoted on the rotation motor 731.

Further, a check valve CV1 can be provided for the liquid transfer tube 51 installed in the first tank 20 at an end portion on a downstream side with respect to the flow direction of the liquid fluid. The check valve CV1 prevents the back-flow of carbon dioxide gas generated by the reaction occurring at the fuel electrode in the liquid fuel cell body, into the first tank 20. With this check valve, it is possible to avoid the interference with the supply of the liquid fluid and the reaction within the fuel cell, which is caused by the back-flow of the carbon dioxide gas into the liquid fuel tank, thereby making it possible to obtain a stable cell output for a long period of time. Further, the check valve CV1 can also prevent the back-flow of the concentration-adjusted liquid fuel into the first tank 20, and therefore it becomes possible with this valve to adjust the concentration of the fuel in the first tank 20 in a stable way.

A check valve CV2 similar to the valve CV1 can be provided for the liquid transfer tube 71 installed in the second tank 30. The check valve CV2 can prevent the back-flow of the high-concentration liquid fuel into the second tank 30, and therefore it becomes possible with this valve to adjust the concentration of the fuel in the first tank 20 in a further stable way.

Further, the first tank 20 may be provided with a stirring device for stirring the liquid fluid contained therein to make the concentration of methanol uniform. The stirring device, as shown in FIG. 2, includes a magnetic impeller 61 provided in the first tank 20 and a rotation device 62 for rotating the impeller without making a contact from the outside of the first tank 20. The rotation device 62 can include a rotation motor 621 and a magnetic rotation device 622 pivoted on the motor 61. The magnetic rotation device 622 rotated by the rotation motor 621 serves to rotate the magnetic impeller 61 that is magnetically coupled, and thus stir the liquid fuel contained in the first tank 20.

The liquid transfer devices provided in the first tank 20 and second tank 30 should be coated with a corrosion resistant coating in order to prevent the elution of ions, such as Al, Cu and Fe ions, which adversely affect electricity-generating property of the fuel cell. The corrosion resistant coating can be formed of an organic polymeric material such as PTFE, PFA or polyethylene (PE) or a metallic material such as Ti or a Ti alloy.

In operation, the rotation motor 731 is driven, first, and thus the driving portion 72 provided in the second tank 30 is driven in a non-contact state. Due to the driving, the liquid transfer tube 71 provided in the second tank 30 is repeatedly expanded and contracted, and thus the high-concentration liquid fuel (for example, a methanol liquid having a concentration of 99% or more, but less than 100%) is supplied to the first tank 20. In the first tank 20, the rotation motor 621 is driven to rotate the impeller 61. While maintaining this state, a predetermined amount of a diluent (water) is introduced from the diluent tank 40 into the first tank 20. The liquid fuel of the first tank 20 is then made to have a uniform concentration by means of the impeller 61. At the same time, the rotation motor 531 is driven, and thus the driving portion 52 provided in the first tank 20 is driven in a non-contact state. Due to the driving, the liquid transfer tube 51 provided in the first tank 20 is repeatedly expanded and contracted, and thus the concentration-adjusted liquid fuel (for example, an aqueous methanol solution having a concentration of 6%) contained in the first tank 30 is supplied to the fuel electrode of the liquid fuel cell body 10. Simultaneously, the oxidizer gas such as air is supplied to the oxidizer electrode of the cell body 10 from the oxidizer gas inlet port 105 of the cell body 10. In this manner, at each of the electrodes, the above-described electrode reactions occur, and electrons extracted during the process of the reactions flow through the external circuit, thus generating electricity. Thus, the external load can be driven.

It should be noted that the liquid transfer devices provided in the first tank 20 and second tank 30 may be of a type that utilizes the capillary force as disclosed in, for example, Jpn. Pat. Appln. KOKAI Publication No. 2001-93551.

When supposing a small-sized liquid fuel cell device, the volume of the first tank 20 can be 18 mL to 48 mL, whereas that of the second tank can be 9 mL to 27 mL.

The driving procedure of the above-described liquid fuel cell device shown in FIG. 2 will now be explained. First, the valve V10 is opened to transfer the diluent (water) from the diluent tank 40 to the first tank 20. Then, the rotation device 73 is driven so as to transfer the high-concentration methanol contained in the second tank 30 into the first tank 20. Thereafter, the rotation device 62 is driven to drive the magnetic impeller 61 provided in the first tank 20, and thus the solution contained in the first tank 20 is stirred. Next, the rotation device 53 is driven so as to transfer the concentration-adjusted methanol solution contained in the first tank 20 to the liquid fuel cell body 10 via the supply tube 104a. In this manner, the initial driving of the liquid fuel cell device shown in FIG. 2 is carried out. After that, the diluent is continuously or intermittently supplied from the diluent tank 40 to the first tank 20, and the high-concentration methanol liquid is supplied continuously or intermittently from the second tank 30 to the first tank 20. At the same time, while appropriately stirring the solution contained in the first tank 20, electricity is thus generated by the fuel cell body. In order to stop the driving of the liquid fuel cell device shown in FIG. 2 and store it for a long period of time, the rotation device 53 is turned off to stop the transfer of the concentration-adjusted methanol solution from the first tank 20 to the liquid fuel cell body 10. Then, the rotation device 73 is turned off to stop the transfer of the high-concentration methanol liquid from the second tank 30 to the first tank 20. Thereafter, the rotation device 62 is turned off to stop the stirring of the solution inside the first tank 20. Lastly, the valve V10 is closed to stop the transfer of the diluent from the diluent tank 40 to the first tank 20.

Figure 3:
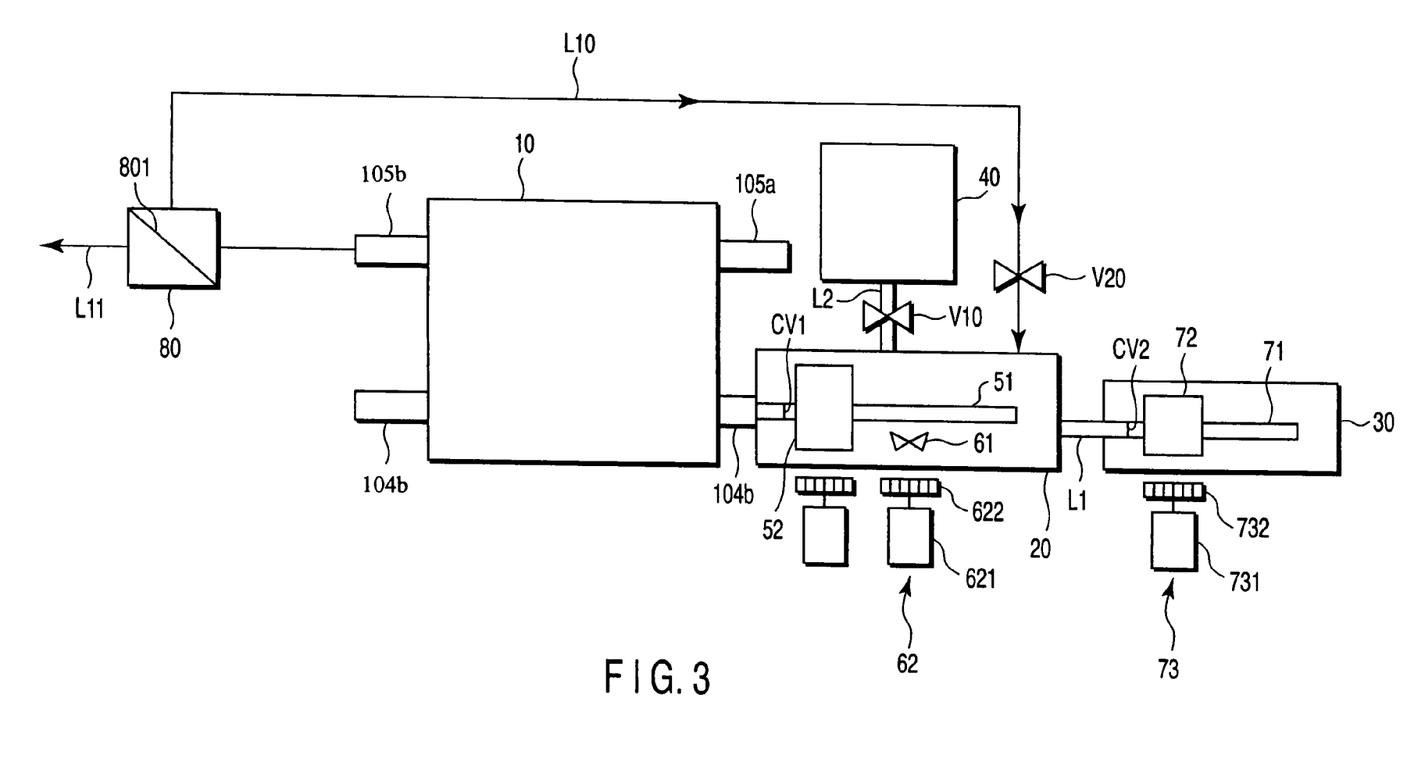
FIG. 3 is a diagram schematically showing the structure of a liquid fuel cell device according to another embodiment of the present invention.

Next, a liquid fuel cell device according to the second embodiment of the present invention will be described with reference to FIG. 3. In FIG. 3, elements similar to those shown in FIG. 2 are designated by the same reference numerals, and their detailed descriptions will not be repeated. The liquid fuel cell device shown in FIG. 3 is different from the fuel cell device shown in FIG. 2 in the respect of the system that supplies a diluent into the first tank 20. In the liquid fuel cell device shown in FIG. 3, the diluent (water) contained in the diluent tank 40 provided as in the case of the fuel cell device shown in FIG. 2 is used only in the initial stage of operation. After the initial stage of operation, the water generated as a product of the reaction taking place at the oxidizer electrode of the cell body 10 is utilized as a diluent. More specifically, to the outlet port 104a for discharging a liquid reaction product (water) generated by the reaction taking place at the oxidizer electrode, a conduit L10 for guiding the discharged water into the first tank 20 is connected. A gas/liquid separating device 80 provided with a gas/liquid separating membrane 801 is mounted in the conduit L10. The gas/liquid separating device 80 serves to separate water discharged together with an excessive amount of oxidizer gas by means of the gas/liquid separating membrane 801, and supplies the thus separated water into the first tank 20 via the conduit L10. The oxidizer gas separated by the separating membrane 801 is discharged to the outside of the system from the discharge conduit L11. Further, the conduit L1 is provided with a flow regulating valve V20 for regulating the amount of water introduced into the first tank 20 through the conduit L11.

Next, the driving procedure of the liquid fuel cell device shown in FIG. 3 will be described. First, as in the case of the fuel cell device shown in FIG. 2, the valve V10 is opened to transfer the diluent (water) from the diluent tank 40 to the first tank 20. Then, the rotation device 73 is driven so as to transfer the high-concentration methanol contained in the second tank 30 into the first tank 20. Thereafter, the rotation device 62 is driven to drive the magnetic impeller 61 provided in the first tank 20, and thus the solution contained in the first tank 20 is stirred. Next, the rotation device 53 is driven so as to transfer the concentration-adjusted methanol solution contained in the first tank 20 to the liquid fuel cell body 10 via the supply tube 104a. In this manner, the liquid fuel cell device shown in FIG. 3 is driven. Next, the water, generated by the liquid fuel cell body as it is driven, is transferred by opening the valve V20 via the gas/liquid separating device 80 and the line L10 to the first tank 20. Thereafter, the valve V10 is closed to stop the introduction of water from the diluent tank 40. From this point, the supply of water to the first tank 20 is conducted with the water generated by the fuel cell body, and supplied through the line L10. Thus, the continuous operation can be carried out.

As described above, in the liquid fuel cell device according to the embodiments of the present invention, a high-concentration liquid fuel, which is contained in the second tank, is supplied from the second tank to the first tank, in which the high concentration fuel is diluted to prepare a concentration-adjusted liquid fuel to be used by the device. With this structure, as compared to the liquid fuel cell device equipped with only one tank (first tank) that contains a concentration-adjusted liquid fuel, the service life is remarkably improved. More specifically, in device having only the first tank for containing a concentration-adjusted liquid fuel, the service life of the fuel cell device is determined by the volume of the concentration-adjusted liquid fluid contained in the first tank. By contrast, in the case where the device further includes the second tank that contains a high concentration liquid fuel, such a device can enjoy a service life that corresponds to the product of the volume of the high concentration liquid fuel contained in the second tank by the dilution factor for the high concentration liquid fuel. Therefore, with the liquid fuel cell device according to the embodiments of the present invention, it becomes possible to achieve an incomparably long time continuous generation of electricity that cannot be obtained by the conventional technique, even if the size of the device is reduced. Further, when the high concentration liquid fuel contained in the second tank is used up, it suffices only if the second tank is replaced with a new one to have the generation of electricity. Thus, a still longer time of electricity generation can be achieved. Further, the liquid transfer device provided in the first tank is driven by an external driving device that is physically separated from this tank. Therefore, it is possible to prevent the leakage of the liquid fuel without providing a liquid seal.

Examples of the present invention will now be described; however the invention is not limited to these Examples.

EXAMPLE 1

A small-sized liquid fuel cell having the structure shown in FIG. 2 was fabricated in the following manner. First, with an ordinary liquid phase method, Pt—Ru-based catalysts were supported on carbon particles. The Pt—Ru-based catalysts on carbon particles were baked in an argon-hydrogen gas stream so as to stabilize the catalysts. To the thus obtained catalyst powder, a solution of a resin binder in an organic solvent was added to make a paste. The paste was then applied on a carbon cloth and dried to form a catalyst layer, thus preparing a fuel electrode. On the other hand, with an ordinary liquid phase method, Pt-based catalysts were supported on carbon particles. The Pt-based catalysts on carbon particles were baked in the manner as described above. To the thus obtained catalyst powder, a solution of a resin binder in an organic solvent was added to make a paste. The paste was then applied on a carbon paper and dried to form a catalyst layer, thus preparing an oxidizer electrode.

The fuel electrode and oxidizer electrode prepared as above were each cut into a piece of a square of 50 mm×50 mm. Between these pieces, an electrolyte membrane (perfluorosulfonic acid resin membrane) having a thickness of 200 μm was interposed. This laminate was integrated under a pressure of 100 kg/cm$^2$ at 135° C. for 15 minutes to obtain a membrane-electrode assembly (MEA). The MEA was provided with separators one on the side of the fuel electrode and the other on the side of the oxidizer electrode, and thus the liquid fuel cell body 10 having the structure shown in FIG. 1 was manufactured.

To the liquid fuel inlet port 104a of the liquid fuel cell body, the first tank 20 prepared from PTFE was connected and the second tank 30 was connected to the first tank 20. The first tank 20 and second tank 30 were provided with the liquid transfer tubes (51 and 71) to which the check valves (CV1 and CV2) were connected respectively, the liquid transfer tube driving devices (52 and 72) made of Ti on the surfaces of which PTFE was coated, and the driving devices (53 and 73). The first tank 30 made of PTFE was provided with the impeller 61 made of Ti on which surface PTFE was coated and with the driving device 62. On the other hand, to the oxidizer inlet port 105a, an air feeding pump that feeds air serving as the oxidizer was connected. Thus, a small-sized liquid fuel cell device having the structure shown in FIG. 2 was fabricated.

The small-sized liquid fuel cell device was driven in the following manner.

First, to make a methanol solution having a concentration of 2M in the first liquid fuel tank 20, methanol liquid having a concentration of 99% was supplied from the second tank 30 and water was supplied from the water tank 40 to the first tank 20. The thus concentration-adjusted methanol aqueous solution was supplied to the fuel electrode of the liquid fuel cell body at a flow rate of 2 mL/min. Next, with the air feeding pump provided on the oxidizer gas side, air that serves as the oxidizer gas was supplied at a flow rate of 100 mL/min. The supply of the methanol liquid from the second tank was carried out not always continuously but sometimes intermittently in order to adjust the concentration of the aqueous methanol solution in the second tank.

Next, an electronic load device was connected to the small-sized liquid fuel cell device, and the electricity generating properties in a range of 0 to 200 mA/cm$^2$ at an electricity generation temperature of 60° C. were measured. The results are shown in FIG. 4.

Figure 4:
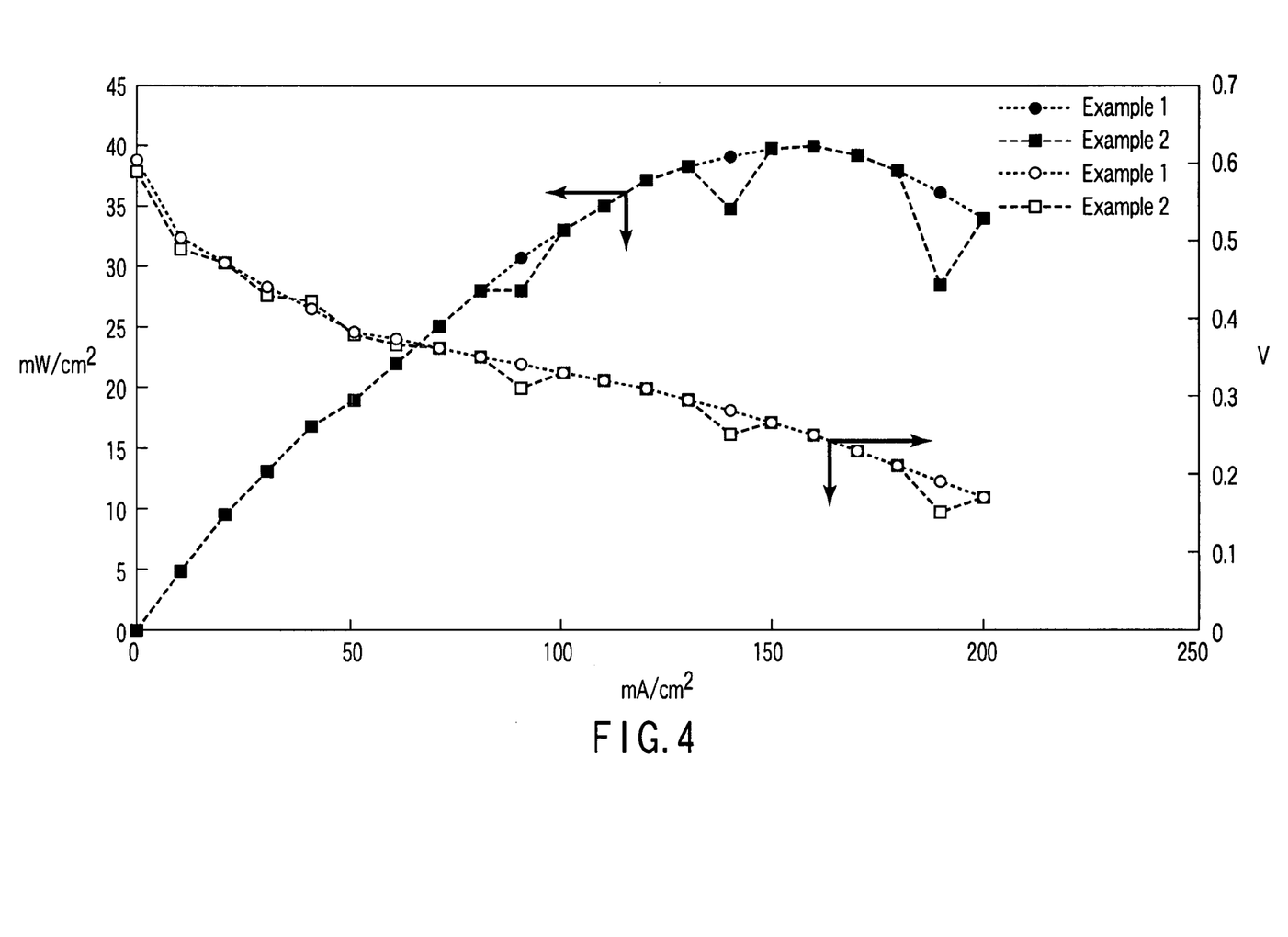
FIG. 4 is a graph showing the electricity generating properties of the liquid fuel cell devices fabricated in Examples 1 and 2 described below.

As shown in FIG. 4, the fuel cell device can take a load up to a current density of about 200 mA/cm$^2$, and the maximum output was 40 mW/cm$^2$. Further, although it is not indicated in FIG. 4, the fuel cell device maintained a stable voltage even after about 10 hours of use, and thus it was confirmed that it was a highly reliable type as a small-sized liquid fuel cell device. It should be noted that in this liquid fuel cell device, the leakage of the liquid fuel was not observed during the operation.

EXAMPLE 2

A liquid fuel cell device was manufactured in a similar manner to that of Example 1 except that the check valves CV1 and CV2 were not used in this Example. The manufactured battery device was tested to measure its output variation when extracting outputs by a method similar to that of Example 1. The results are shown also in FIG. 4 along with the results of Example 1. As compared to Example 1, a somewhat variation in the output characteristic curve was observed in a high current side; however it was confirmed at the same time that the fuel cell device of this Example exhibited excellent electricity generation properties. It is considered that the variation occurred due to the back-flow of the carbon dioxide gas generated on the fuel electrode when generating the electricity, into the liquid fuel tank, thereby blocking the supply of the fuel. It should be noted that in this liquid fuel cell device, the leakage of the liquid fuel was not observed during the operation.

EXAMPLE 3

A liquid fuel cell device was manufactured in a similar manner to that of Example 1. In the manufactured battery device, the volume of the first tank was 190 mL and that of the second tank was 95 mL. This battery device was driven in a similar manner to that of Example 1 at a current density of about 150 mA/cm$^2$. As presented in FIG. 5, an output of about 40 mW/cm$^2$ was obtained stably for about 100 hours. It should be noted that in this liquid fuel cell device, the leakage of the liquid fuel was not observed during the operation.

Comparative Example 1

Figure 5:
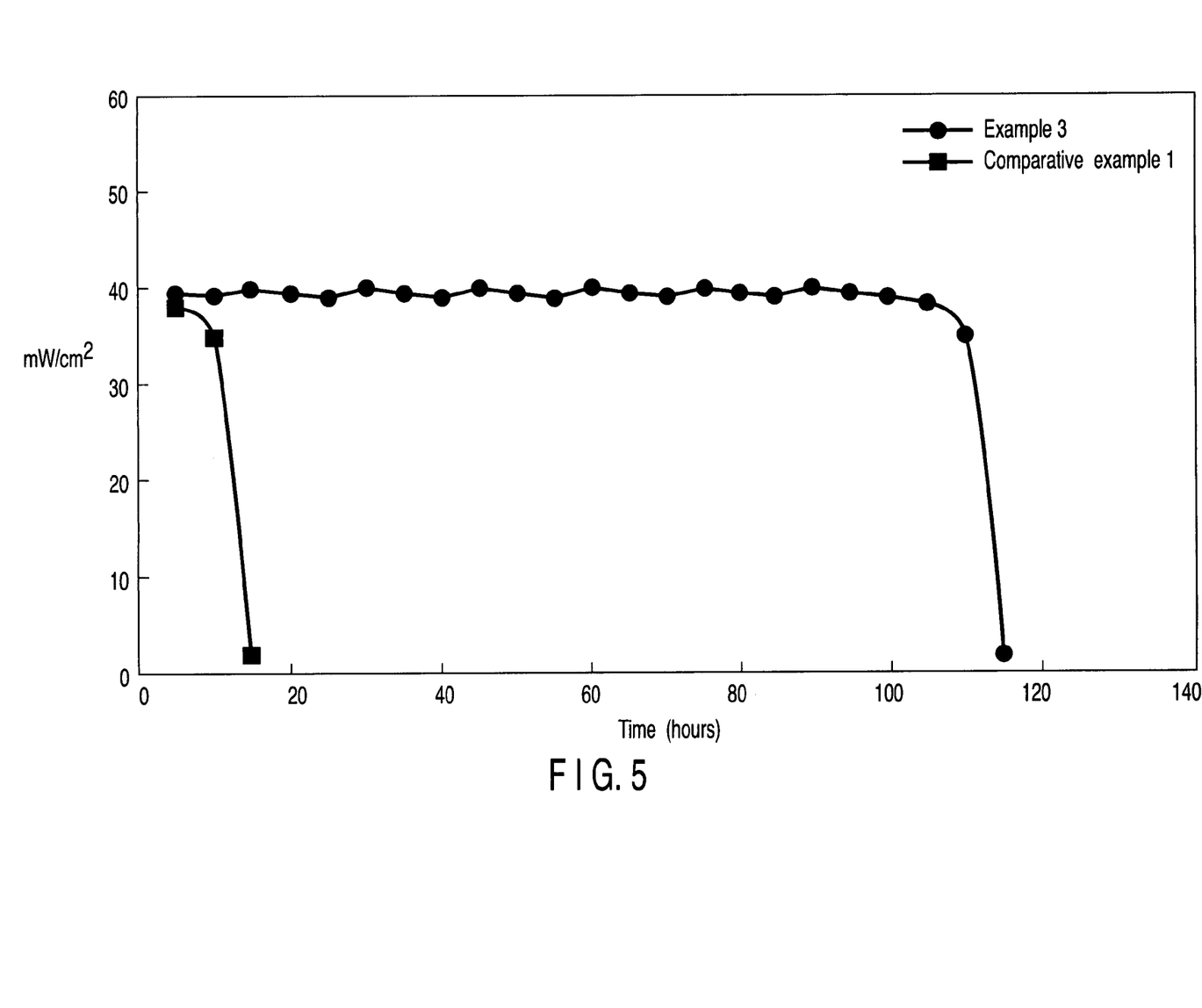
FIG. 5 is a graph showing the usable lifetime of each of the liquid fuel cell devices fabricated in Example 3 and Comparative Example 1 described below.

An operation similar to that of Example 3 was conducted except that the second tank was not employed. As indicated in FIG. 5, the device used in this Comparative Example exhibited lowering of its output after about 6 hours of use.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid fuel cell device comprising: a liquid fuel cell body including a fuel electrode, an oxidizer electrode placed opposite to the fuel electrode and an electrolyte layer provided between the fuel electrode and the oxidizer electrode; and a liquid fuel supply system configured to supply a liquid fuel to the fuel electrode,
   the liquid fuel supply system comprising a first tank configured to contain a concentration-adjusted liquid fuel and supply the concentration-adjusted liquid fuel to the fuel electrode; and a second tank configured to contain a high-concentration liquid fuel and supply the high-concentration liquid fuel to the first tank;
   the first tank comprising a first internal liquid transfer device configured to transfer the concentration-adjusted liquid fuel to the fuel electrode;
   the fuel cell device further comprising a first external driving device provided outside the first tank and configured to drive the first internal liquid transfer device, the first external driving device being physically separated from the first internal liquid transfer device.

2. The device according to claim 1, wherein the first internal liquid transfer device comprises a first liquid transfer tube and a first tube driving device configured to expand and compress the first liquid transfer tube, thereby transferring the liquid fuel.

3. The device according to claim 2, wherein the first liquid transfer tube comprises a check valve.

4. The device according to claim 1, wherein the first internal liquid transfer device and the first external driving device are magnetically coupled.

5. The device according to claim 1, wherein the second tank comprises a second internal liquid transfer device configured to transfer the liquid fuel to the first tank, and the liquid fuel cell device further comprises a second external driving device provided outside the second tank to be physically separated from the second internal liquid transfer device and configured to drive the second internal liquid transfer device.

6. The device according to claim 5, wherein the second internal liquid transfer device further comprises a second liquid transfer tube and a second tube driving device configured to expand and compress the second liquid transfer tube, thereby transferring the liquid fuel.

7. The device according to claim 6, wherein the second liquid transfer tube comprises a check valve.

8. The device according to claim 5, wherein the second internal liquid transfer device and the second external driving device are magnetically coupled.

9. The device according to claim 1, wherein the liquid fuel comprises methanol.

10. The device according to claim 1, further comprising a diluent tank configured to contain a diluent which dilutes the high-concentration liquid fuel supplied from the second tank to the first tank to adjust a concentration of the liquid fuel, and supply the diluent to the first tank.

11. The device according to claim 10, wherein a magnetic stirring device is provided in the first tank.

12. The device according to claim 10, wherein the liquid fuel comprises methanol and the diluent comprises water.

13. The device according to claim 1, further comprising a conduit configured to supply a liquid reaction product generated at the oxidizer electrode to the first tank as a diluent which dilutes the high-concentration liquid fuel supplied from the second tank to the first tank to adjust a concentration of the liquid fuel.

14. The device according to claim 13, wherein a magnetic stirring device is provided in the first tank.

15. The device according to claim 13, wherein the liquid fuel comprises methanol and the liquid reaction product comprises water.

16. The device according to claim 1, wherein the first tank is made of a corrosion resistant material.

17. The device according to claim 16, wherein the corrosion resistant material is selected from the group consisting of Ti, a fluororesin, a butadiene rubber, a styrene rubber, a butyl rubber, an ethylene-propylene rubber and a natural rubber.

18. The device according to claim 1, wherein the second tank is made of a corrosion resistant material.

19. The device according to claim 18, wherein the corrosion resistant material is selected from the group consisting of Ti, a fluororesin, a butadiene rubber, a styrene rubber, a butyl rubber, an ethylene-propylene rubber and a natural rubber.

20. The device according to claim 1, wherein the second tank is detachably connected to the first tank.

21. The device according to claim 1, wherein the first internal liquid transfer device is provided with a corrosion resistant coating.

22. The device according to claim 21, wherein the corrosion resistant coating comprises Ti, a fluororesin or a polyethylene.

23. The device according to claim 5, wherein the second internal liquid transfer device is provided with a corrosion resistant coating.

24. The device according to claim 23, wherein the corrosion resistant coating comprises Ti, a fluororesin or a polyethylene.

* * * * *